Oct. 15, 1957  G. R. BOUCHARD  2,809,505
EXPANSIBLE UNIVERSAL JOINTS

Filed April 18, 1956  2 Sheets-Sheet 1

INVENTOR
Gaston Robert Bouchard
BY
Bailey Stephens and Huettig
ATTORNEYS

Oct. 15, 1957   G. R. BOUCHARD   2,809,505
EXPANSIBLE UNIVERSAL JOINTS
Filed April 18, 1956   2 Sheets-Sheet 2
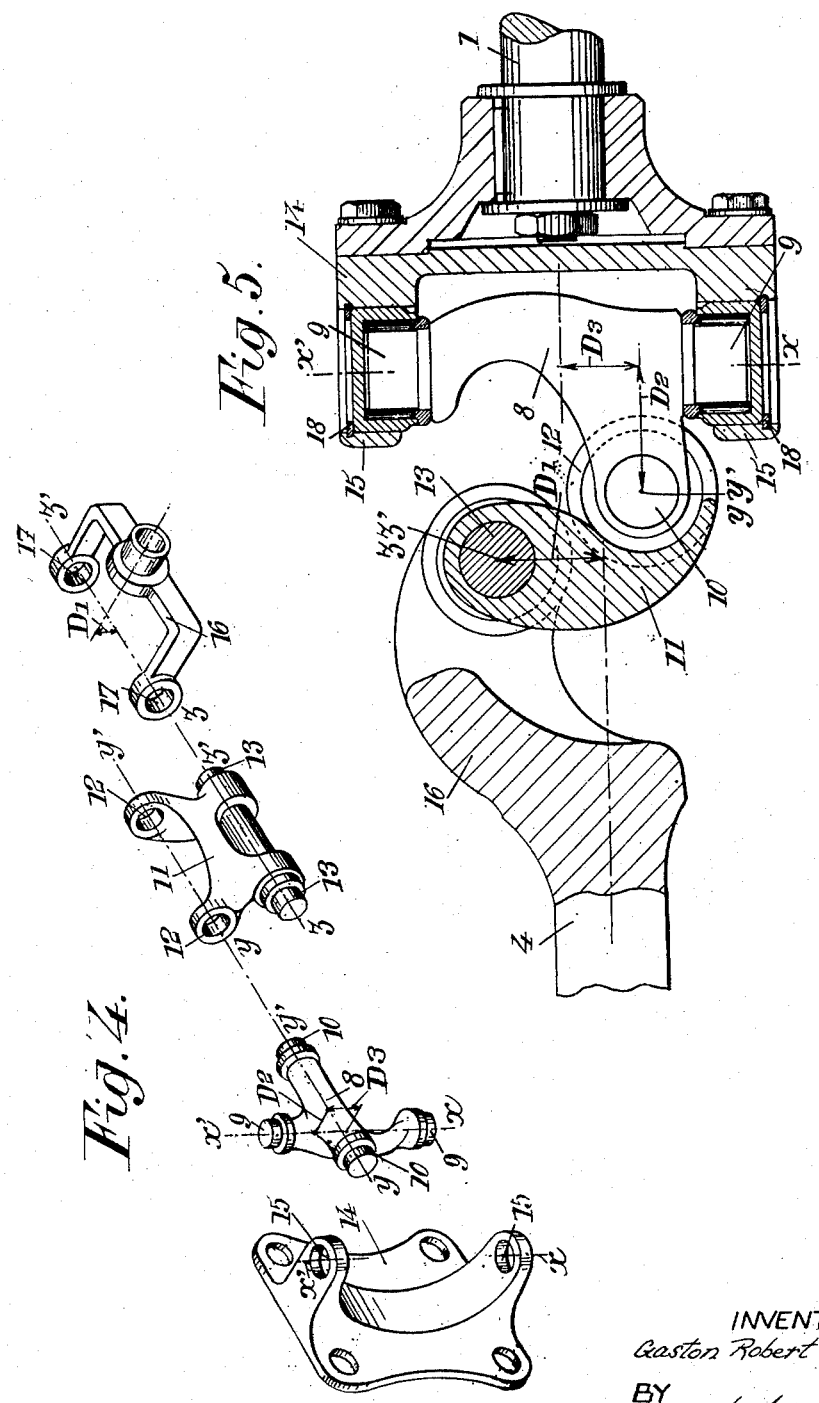
INVENTOR
Gaston Robert Bouchard
BY
Bailey Stephens & Huettig
ATTORNEYS

# United States Patent Office 2,809,505
Patented Oct. 15, 1957

2,809,505

EXPANSIBLE UNIVERSAL JOINTS

Gaston Robert Bouchard, Bougival, France

Application April 18, 1956, Serial No. 578,941

Claims priority, application France April 21, 1955

5 Claims. (Cl. 64—17)

The present invention relates to expansible universal joints, this term designating rotating devices for coupling a driving shaft with a driven shaft the axis of which substantially intersects that of the driving shaft, such devices being constituted by elements arranged and pivoted together in such manner that they permit relative axial displacements of said shafts.

My invention is more especially but not exclusively concerned with transmissions for automobile vehicles and in particular transverse transmissions for connecting the differential of an automobile vehicle with one wheel thereof, for instance a front wheel.

The chief object of my invention is to provide a device of this kind which is better adapted to meet the requirements of practice than those existing up to the present time, and in particular which permits relative axial displacements of great amplitude of the driving and driven shafts, without impairing the rigidity of the device forming the joint or the facility of construction of the elements thereof.

The universal joint according to my invention includes two end pivot members respectively carried by the driving shaft and by the driven shaft, one of these end pivot members, for instance that relative to the driven shaft, being perpendicular to the axis of the corresponding shaft (the axis of this pivot member practically intersecting at right angles the axis of the driven shaft), whereas the other end pivot member is orthoganol with respect to the shaft that carries it, which is the driving shaft, but is laterally offset with respect thereto, whereby the axis of said last mentioned pivot member does not intersect the axis of said driving shaft, the joint further including an intermediate pivot member connecting together two pieces, respectively pivoted with respect to said driving and driven shafts through the above mentioned end pivot members, this third pivot member being substantially parallel to the axis of the pivot member which is offset with respect to its shaft, and the universal joint is characterized in that said third mentioned intermediate pivot member is offset with respect to the first mentioned end pivot member toward the shaft carrying the other end pivot member.

Other features of my invention will become apparent in the course of the folloing detailed description of some specific embodiments thereof, with reference to the accompanying drawings, given merely by way of example and in which:

Fig. 4 is an exploded perspective view of the elements forming a universal joint according to my invention.

Fig. 5 is a middle sectional view of said universal joint with the parts thereof assembled together.

Figure 1:
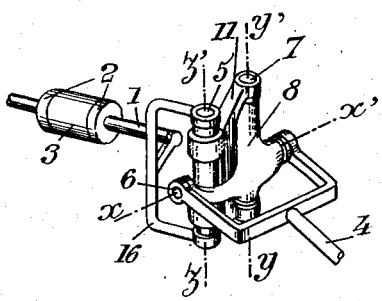
Fig. 1 is a perspective view of a universal joint made according to my invention.
Figure 2:
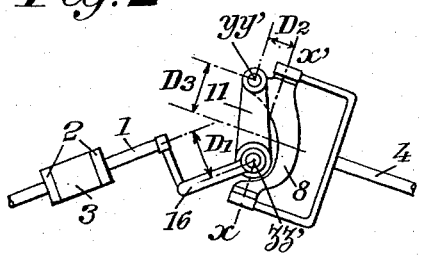
Fig. 2 is a top view of the universal joint of Fig. 1.
Figure 3:
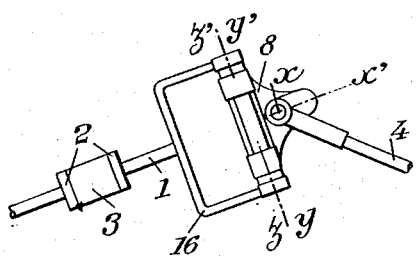
Fig. 3 is a side view of the same universal joint.

The universal joint illustrated by Figs. 1 to 3 is intended to couple together a driving shaft 1 (which may be held by means of two fixed collars 2 disposed on either side of a thrust bearing 3) and a driven shaft 4 carrying for instance a wheel to be driven. This driven shaft must be capable of sliding axially in both directions between given limits.

Such a universal joint includes the following elements, as diagrammatically illustrated by Figs. 1 to 3:

On the one hand, two end pivot members 5 and 6 the respective axes of which are $z-z'$ and $x-x'$, said pivot members being carried respectively by the driving shaft 1 and the driven shaft 4; one of these pivot members, for instance pivot member 6 corresponding to the driven shaft 4, is perpendicular to the corresponding shaft (the axis $x-x'$ of pivot member 6 practically intersecting the axis of the driven shaft 4 at right angles thereto), whereas the other end member, to wit member 5, is at right angles to the shaft that carries it (driving shaft 1) but is laterally offset with respect thereto, so that the axis $z-z'$ of pivot member 5 does not intersect the axis of the driving shaft 1; and On the other hand, an intermediate pivot 7 the axis of which is $y-y'$ substantially parallel to the axis $z-z'$ of the offset end pivot member 5 and transverse or substantially at right angles to the axis $x-x'$ of the end pivot member 6, this intermediate pivot member 7 serving to connect together two pieces 8 and 11 pivoted respectively with respect to shaft 4 about axis $x-x'$ and with respect to shaft 1 about axis $z-z'$, whereby said pieces 8 and 11 can pivot with respect to each other about said axis $y-y'$.

Now, according to my invention, as illustrated by Fig. 2, the intermediate pivot member 7 has its axis $y-y'$ offset with respect to the axis $x-x'$ of the end pivot member 6 toward shaft 1 (which carries the end pivot member 5 the axis $z-z'$ of which is laterally offset with respect to shaft 1).

The axis $y-y'$ of the intermediate pivot member 7, in addition to being offset axially (by an amount indicated at $D_2$) with respect to pivot member 6, is laterally offset (by an amount indicated by $D_3$) with respect to the axis of shaft 4. As above indicated, the axial offsetting $D_2$ is toward shaft 1. The lateral offsetting $D_3$ is away from the end pivot member 5 (which is itself laterally offset by a length $D_1$ with respect to the driving shaft 1).

Thus, owing to the lateral offsetting $D_1$ of the end pivot member 5 and to the double offsetting ($D_2$ and $D_3$) of the intermediate pivot member 7, it is possible to make use in the best possible conditions of the space located between the corresponding ends of shafts 1 and 4.

In other words my invention permits either for a given space to establish constitutive elements of a simpler shape and of higher rigidity, or, for a given rigidity of the constitutive elements, to obtain a universal joint having a higher capacity of expansion.

On the other hand, due to the axial offsetting $D_2$ of the intermediate pivot member 7, the unbalance inherent in this kind of joint varies in intensity and in axial position during the rotation (for given axial positions and relative directions of shafts 1 and 4), which prevents any possibility of resonance.

Figs. 4 and 5 illustrate a practical embodiment of the universal joint above described. It is pointed out that, in order to indicate a possible variation in the construction of Figs. 4 and 5, the offset end pivot member which, in the arrangement illustrated by Figs. 1 to 3, was that carried by the driven shaft 4, is, in the present case, that carried by the driving shaft 1.

The joint of Figs. 4 and 5 includes the following elements:

A cross-shaped member 8 having unequal branches and carrying two pairs of journals 9 and 10 which correspond respectively to the orthogonal axis $x-x'$ of the end pivot member 6, and $y-y'$ of the intermediate pivot member 7 which is offset with respect to x—x', both axially (offsetting $D_2$) and laterally (offsetting $D_3$);

A piece 11 including bearings 12 adapted to cooperate with the journals 10 of piece 8, piece 11 further including two bearings in line with each other along the axis z—z' and in which is fitted a spindle forming two journals 13 parallel to bearings 12 and at a distance therefrom;

A fork constituted by a member 14 and in the branches of which are provided bearings 15 intended to cooperate with the journals 9 of cross-shaped piece 8;

Finally, a fork 16 the branches of which are offset with respect to the axis of its central part (as shown at $D_1$) is provided with bearings 17 intended to cooperate with the journals 13 carried by piece 11.

On Fig. 5 the various elements above described are shown assembled together and secured by means of elastic stopping rings 18.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A universal joint transmission which comprises, in combination, two pieces pivoted to each other about a single pivot axis, a first shaft pivoted to one of said pieces about a second pivot axis and a second shaft pivoted to the other of said pieces about a third pivot axis, one of said shafts being a driving shaft and the other a driven shaft, said first mentioned pivot axis being offset with respect to said second pivot axis toward said second shaft and said second pivot axis being at least substantially at right angles both to the first shaft, which is pivoted thereabout, and to said first mentioned pivot axis, said third pivot axis being substantially parallel to said first mentioned pivot axis and located at a distance thereof and substantially at right angles to the second shaft, which is pivoted about said third pivot axis, one of said shafts being offset toward the axis of the other shaft with respect to the pivot axis about which said offset shaft is pivoted to the corresponding piece.

2. A universal joint transmission which comprises, in combination, two pieces pivoted to each other about a single pivot axis, a first shaft pivoted to one of said pieces about a second pivot axis and a second shaft pivoted to the other of said pieces about a third pivot axis, one of said shafts being a driving shaft and the other a driven shaft, said first mentioned pivot axis being offset with respect to said second pivot axis toward said second shaft and said second pivot axis being at least substantially at right angles both to the first shaft, which is pivoted thereabout, and to said first mentioned pivot axis, said third pivot axis being substantially parallel to said first mentioned pivot axis and located at a distance thereof and substantially at right angles to the second shaft, which is pivoted about said third pivot axis, said second shaft being offset with respect to said third pivot axis toward the axis of said first shaft.

3. A universal joint transmission according to claim 2 in which said first mentioned pivot axis is further offset with respect to the axis of the first shaft away from said third mentioned pivot axis.

4. For use in a system including two shafts, a universal joint device for coupling said shafts together which comprises, in combination, a cross-shaped male piece having two pairs of alined branches the respective axes of which are at right angles to each other but do not intersect each other, the two opposed branches of one pair being of the same length whereas one of the branches of the other pair is longer than the other branch of said second mentioned pair, a female piece pivoted to said male piece about a single pivot axis constituted by the axis of said first mentioned pair of branches thereof, said female piece extending from said first mentioned pair of branches toward the end of the longer branch of said second mentioned pair of branches and extending on only one side of said cross-shaped male piece, a fork pivoted to said male piece about a single pivot axis constituted by the axis of said second mentioned pair of branches, said fork being on the other side of said male piece from said female piece, said fork being fixed to one of said shafts so that the axis of said last mentioned shaft is substantially at right angles to the axis of said second mentioned pair of branches, and a fork pivoted to said female piece about a single pivot axis at least substantially parallel to the axis of said first mentioned pair of branches and at a substantial distance therefrom, said last mentioned fork being on the same side of said male piece as said female piece, said last mentioned fork being fixed to the other shaft so that the axis of said last mentioned shaft is substantially at right angles to said last mentioned pivot axis but does not intersect it, the axis of the first mentioned pair of branches being located on the same side of the axis of the second mentioned pair of branches as the last mentioned shaft.

5. A universal joint according to claim 4 in which the ends of said first mentioned pair of branches of said male piece form a first pair of journals respectively having as their common axis the axis of said first mentioned pair of branches and the ends of said second mentioned pair of branches of said male piece form a second pair of journals respectively having as their common axis the axis of said second mentioned pair of branches, said first mentioned fork being provided with a pair of bearings mounted in cooperative engagement with said pair of journals of said second pair of branches respectively and said female piece being provided with a pair of bearings mounted in cooperative engagement with said pair of journals of said first pair of branches, said female piece being further provided with a pair of bearings located along said third mentioned pivot axis, a spindle fitted on said bearings, the ends of said spindle forming two alined journals, and said second mentioned fork being provided with a pair of bearings in cooperative engagement with said two last mentioned journals, respectively.

References Cited in the file of this patent

UNITED STATES PATENTS

| | | |
|---|---|---|
| 652,142 | Robinson | June 19, 1900 |
| 2,666,308 | Bouchard | Jan. 19, 1954 |